UNITED STATES PATENT OFFICE.

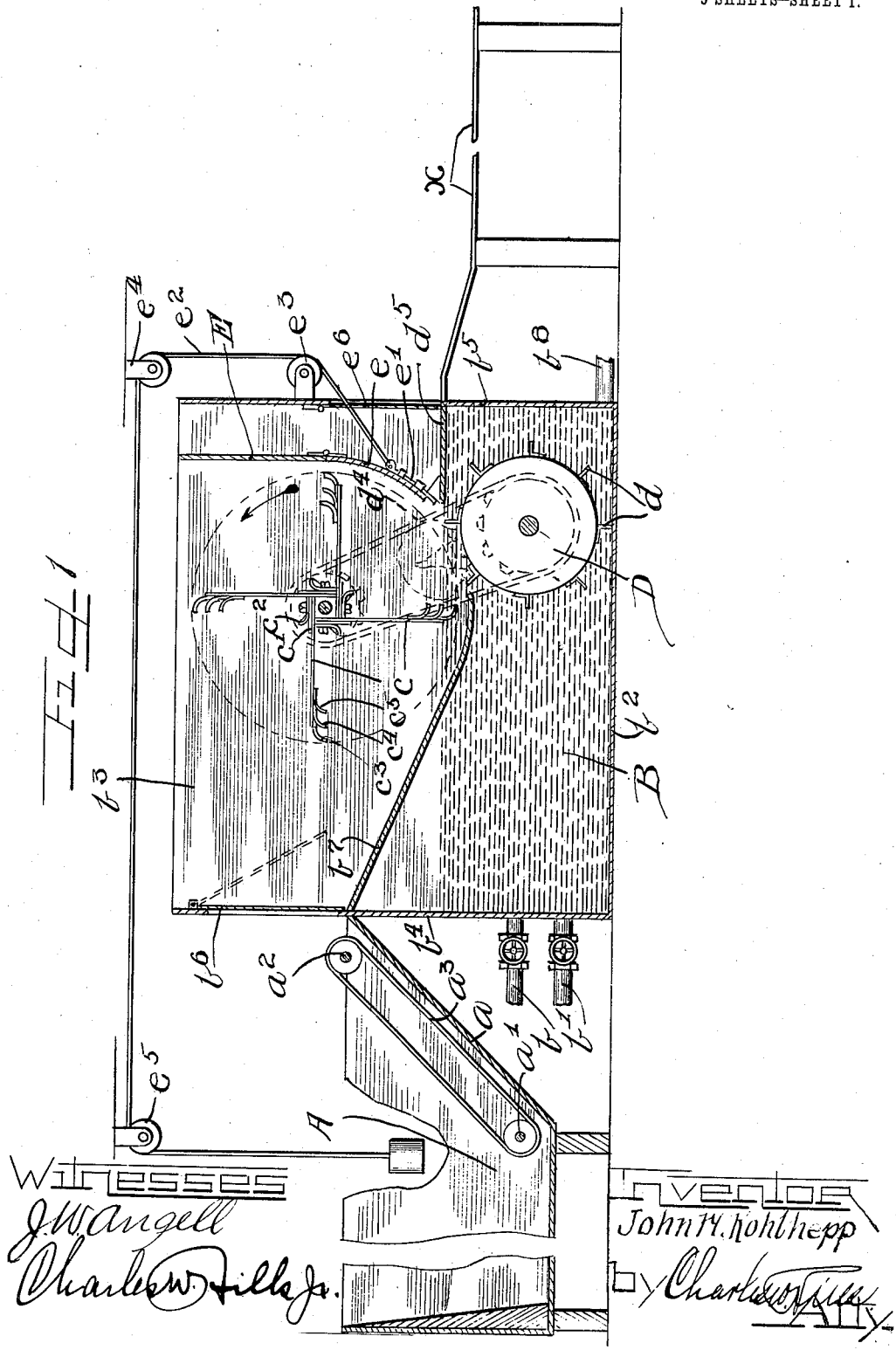

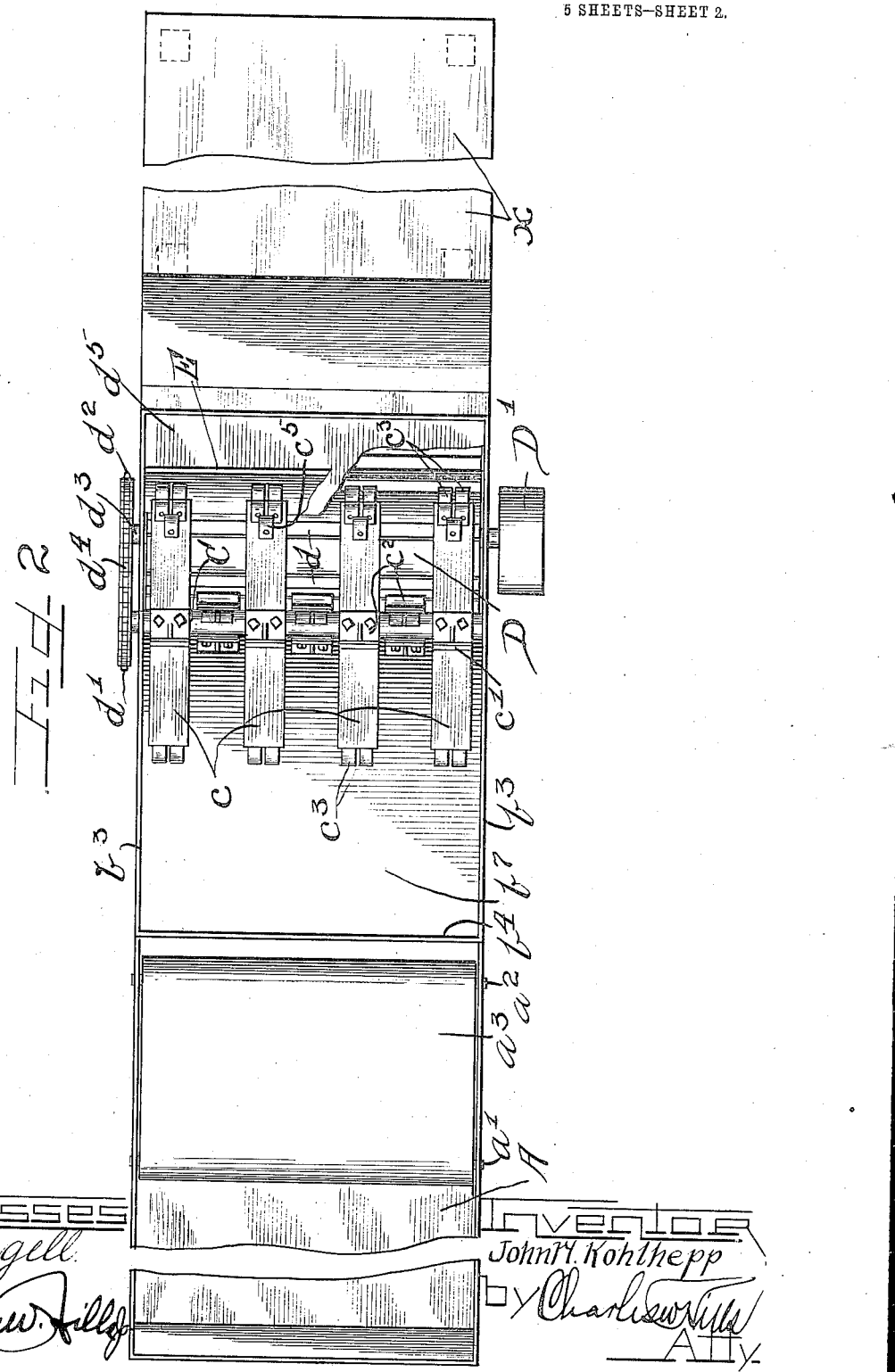

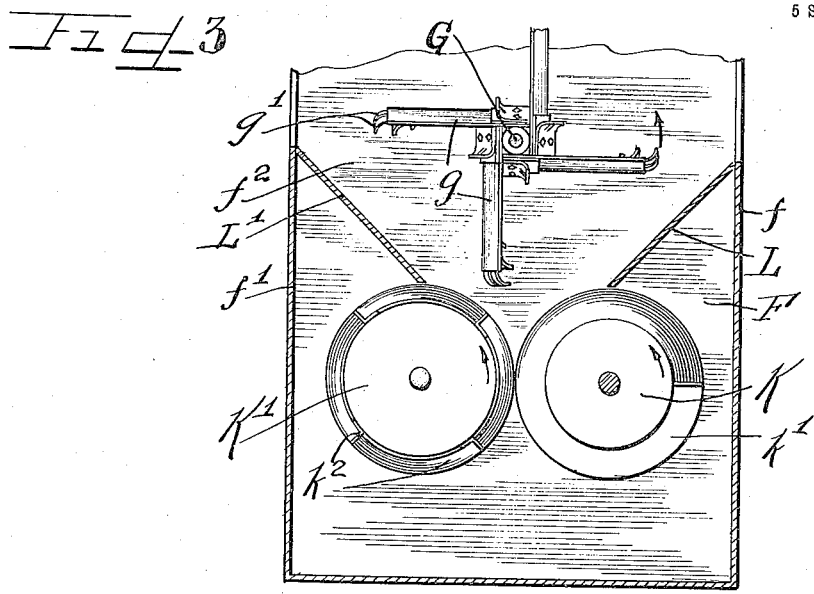
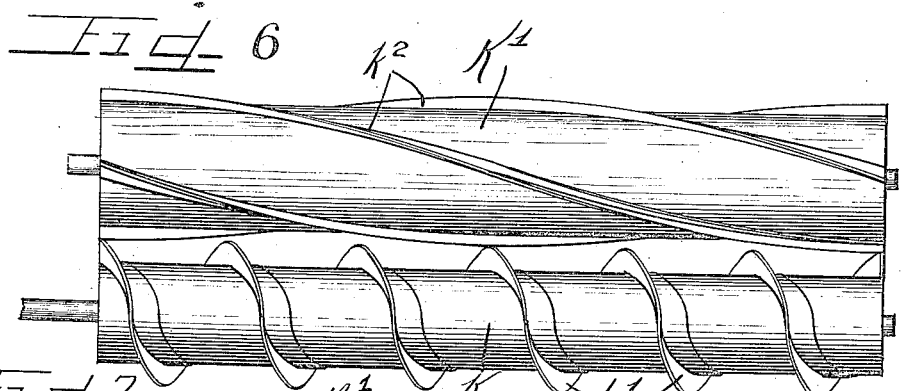
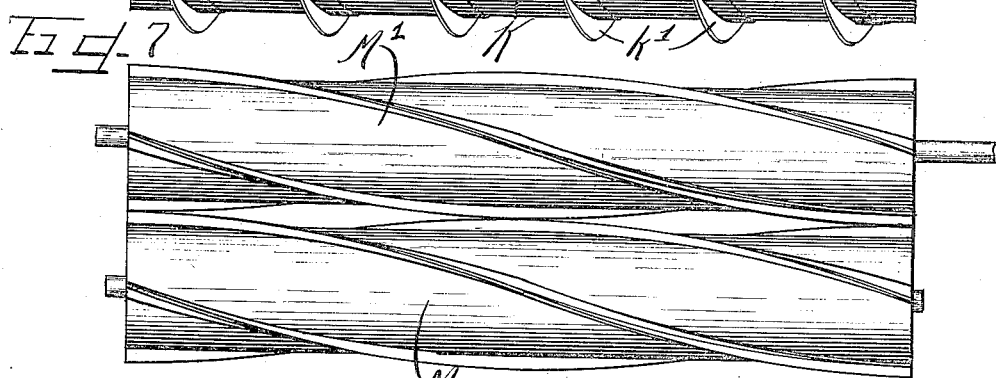

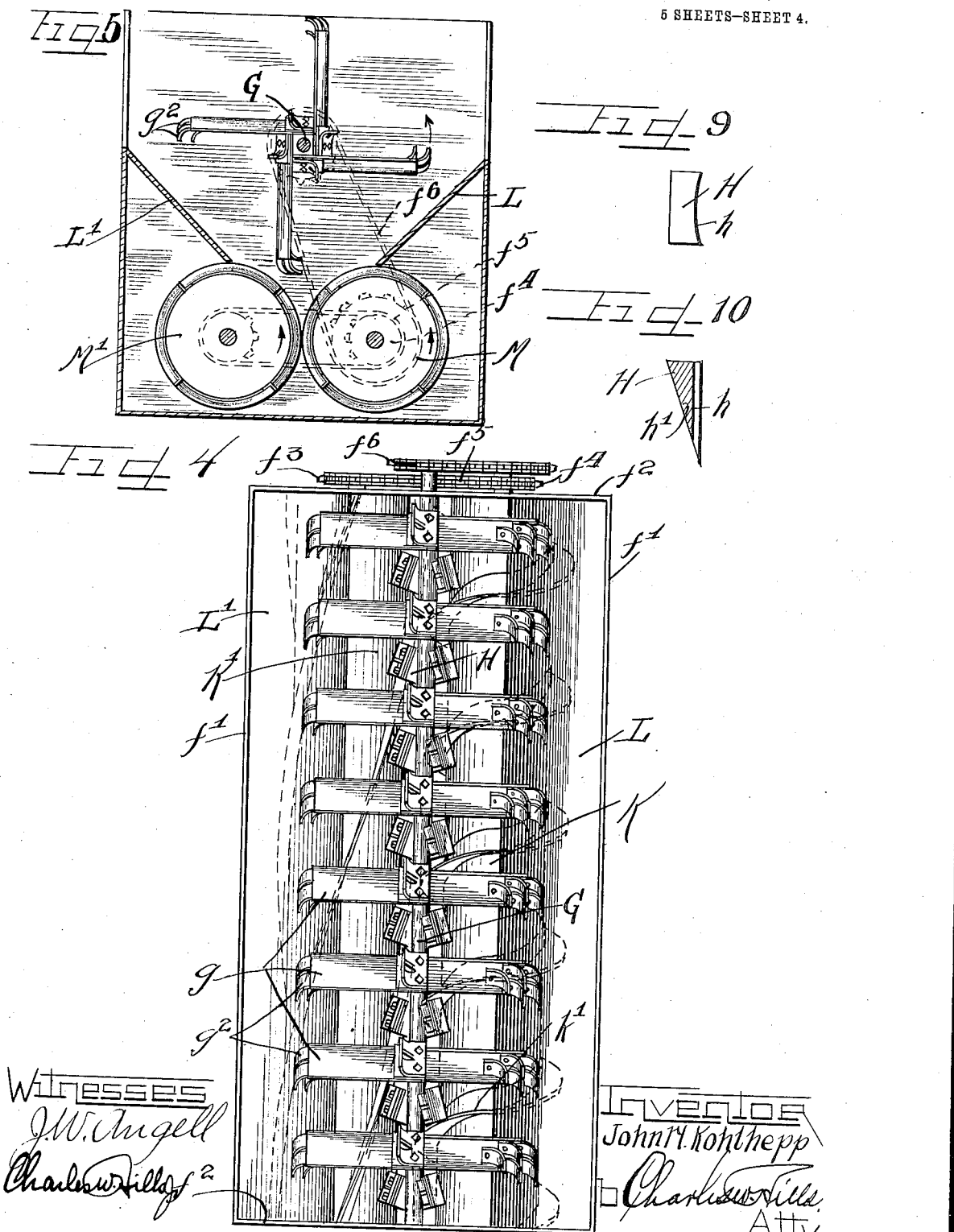

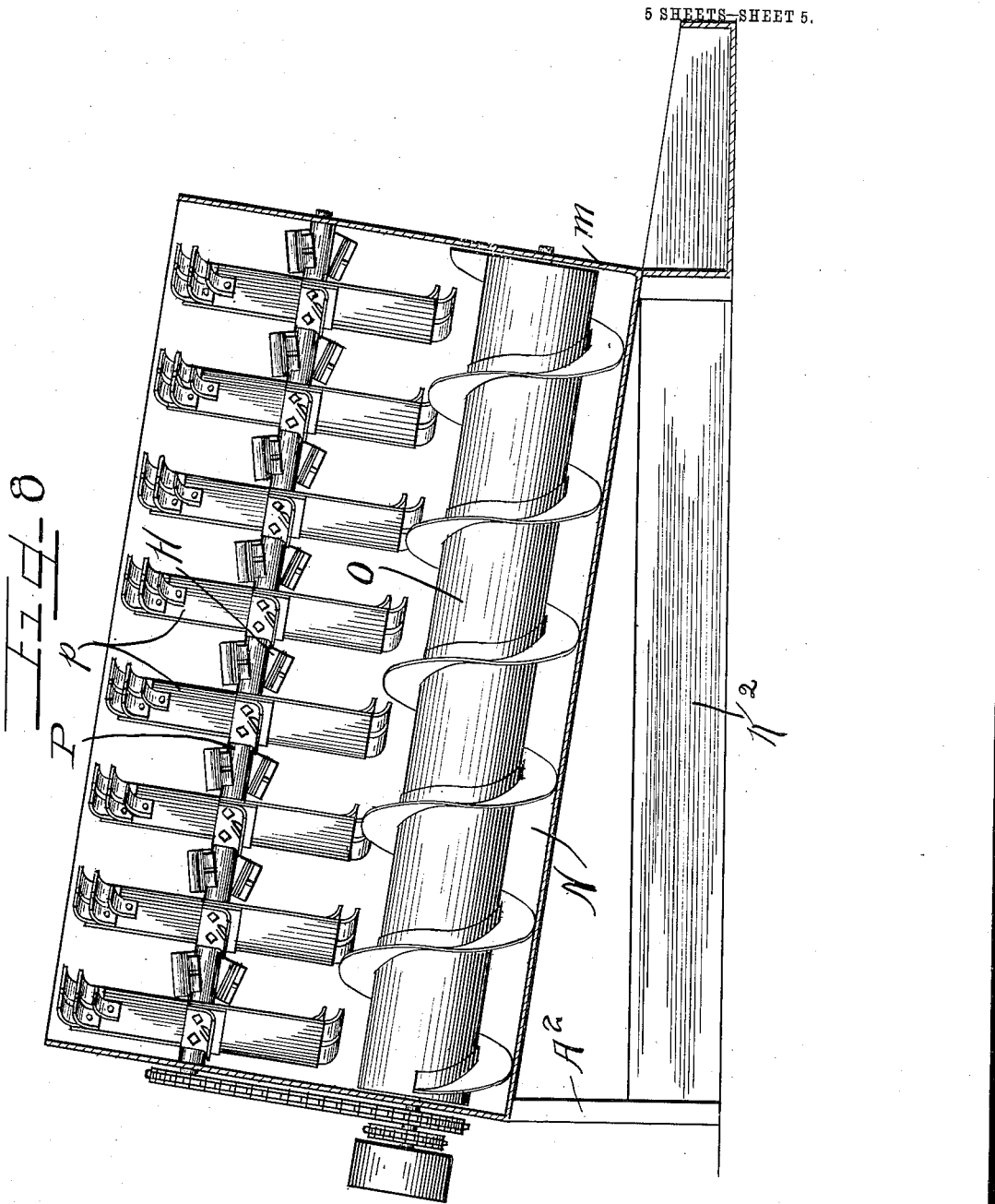

JOHN W. KOHLHEPP, OF CHICAGO, ILLINOIS, ASSIGNOR TO THE ALLBRIGHT-NELL COMPANY, A CORPORATION OF ILLINOIS.

CARCASS POLISHING AND CLEANING MECHANISM.

1,125,562.       Specification of Letters Patent.       Patented Jan. 19, 1915.

Original application filed July 17, 1907, Serial No. 384,287. Divided and this application filed March 23, 1912. Serial No. 685,835.

*To all whom it may concern:*

Be it known that I, JOHN W. KOHLHEPP, a citizen of the United States, and a resident of Chicago, in the county of Cook and State of Illinois, have invented certain new and useful Improvements in Carcass Polishing and Cleaning Mechanisms; and I do hereby declare that the following is a full, clear, and exact description of the same, reference being had to the accompanying drawings, and to the letters of reference marked thereon, which form a part of this specification.

The present application constitutes a division of my prior application for patent for "carcass scraping, polishing and cleaning mechanisms," Serial No. 384,287, filed July 17, 1907.

This invention relates to improvements in scraping mechanisms and particularly to that class adapted for scraping, polishing and cleaning hogs.

Heretofore in carcass scraping machines the carcasses have been supported on or suspended from a suitable conveyer and passed between scraping devices suitably arranged to act thereon. Where the carcasses are supported lengthwise on the conveyer there has always been a strip extending the entire length the carcass that could not be acted upon by the scraping mechanism and in that class of machine in which the carcass is suspended by hooks there is always a portion where the hook engages that is not scraped. Furthermore machines employing conveyers which necessitate carriages and hooks being used for engaging the carcasses are quite expensive to install, requiring considerable space, constantly need repairing and consist of a multiplicity of parts.

It is an object of this invention to provide a construction in which mechanism is provided capable of both conveying the carcasses past the scrapers and constantly rotating the same simultaneously for exposing all parts to the action of the scrapers and in which the use of hooks for engaging the carcasses can be dispensed with. Also the hog scraping mechanisms heretofore have only been adapted to clean the carcass and have not in any way aided in forcing the carcasses through the machine.

It is an object of this invention to provide a carcass scraping machine in which the use of a conveyer necessitating the use of hooks and carriages is eliminated.

It is a further object of this invention to provide a machine in which the carcasses are moved past the scrapers at the desired rate or may remain in one place in the machine until completely cleaned and in which the carcasses are continuously rotated or turned, thereby exposing all parts to the action of the scrapers and to provide a scraping device in which it is practically impossible to dislodge a carcass while being acted upon by the beaters.

It is a very important object of this invention to provide spiral rolls, drums or cylinders or plain rolls or drums with spiral rings, bars, bands, etc., secured thereto for supporting the carcasses, moving or conveying the same past the scrapers and simultaneously rotating or turning the carcasses.

It is a very important object of this invention to provide either a rigid spiral roll, drum or cylinder adapted for use when passing carcasses through the machine at certain velocities; for instance, slow travel, and to provide rolls, cylinders or drums having flexible, resilient and yielding spiral strips or bars secured thereto, which are adaptable for moving carcasses rapidly through the machine and may be set for any maximum rate of travel desired for the carcasses so that even though the velocity of the rolls should exceed the limit desired for most efficient scraping, yet in which the resilient or flexible spirals will yield to prevent the carcasses from moving faster than the desired rate.

It is an exceedingly important object of this invention to provide a machine of the class specified in which a plurality of spiral rolls having the same or differently formed convolutions thereon, are used conjointly for supporting, conveying and rotating the carcasses, or in which a roll and conveyer are conjointly used for this purpose.

It is also an important object of this invention to provide a machine in which flexible scraping mechanisms are employed, and in which the scraping mechanisms coact with the aforesaid conveying or moving and rotating mechanism for forcing the carcasses through the machine.

It is also an object of this invention to provide a device of the class specified in which the rotating and moving carcasses are partly submerged in fluid at a suitable temperature whereby the hair, dirt and refuse is washed off as loosened and in which the carcasses are polished and scraped simultaneously.

It is a further object of this invention to provide a device in which the carcasses are, if necessary, further scalded while being acted upon by the scrapers should they not have been properly scalded in the scalding vat or tank but entirely eliminating the use of spraying and pumping devices.

It is also an object of this invention to provide a device in which the carcasses are delivered by gravity to the moving and rotating mechanism and a gravity exit therefor after scraping.

It is a further object of this invention to provide a highly efficient and greatly simplified machine of both small and great capacity and the capacity depending upon the arrangement of the rollers and scrapers.

It is finally an object of this invention to provide a durable machine in which delicate mechanisms and parts are entirely avoided and which requires minimum number of attendants.

The invention consists of the matters hereinafter described and more fully pointed out and defined in the appended claims.

In the drawings: Figure 1 is a longitudinal, vertical section of a device embodying my invention, with the scraping mechanisms arranged transversely the travel of the carcass. Fig. 2 is a top plan view thereof. Fig. 3 is a transverse vertical section of a device embodying my invention, in which the beaters, rotating and moving mechanisms are arranged longitudinally of the machine. Fig. 4 is a top plan view. Fig. 5 is a section similar to Fig. 3, with the beaters arranged differently. Fig. 6 illustrates the moving and rotating rolls or drums employed in Figs. 3 and 4. Fig. 7 illustrates the moving and rotating rolls or drums employed in Fig. 5. Fig. 8 is a modified form of a device embodying my invention, having the mechanisms inclined. Fig. 9 is a detail of the wedge blocks. Fig. 10 is a vertical section taken through Fig. 9.

As shown in the drawings: A, indicates a scalding vat or tank constructed of any suitable material and size, and having the rear bottom wall $a$ thereof inclined upwardly and rearwardly. Journaled in the sides of the tank at the upper and lower ends of said inclined wall $a$ are shafts $a'$—$a^2$, on which the elevator $a^3$, is supported. Adjacent the rear end of said scalding tank A, is a water tank B, provided with suitable water inlet $b$, and steam or heating fluid $b'$, and with a suitable washout pipe or plug $b^8$. Said tank B, is constructed of sheet metal or any other preferred material and comprises a bottom wall $b^2$, side walls $b^3$, and end walls $b^4$—$b^5$, of a height, width and length to contain the various mechanisms therein. The wall $b^4$, of the tank B, is placed against the top of the inclined wall $a$, of the scalding vat and is provided with a swinging or automatically closing door $b^6$, above the top of the inclined wall of the scalding tank, which is of a length to admit the hog lengthwise therethrough from the conveyer $a^3$. Rigidly secured to the side walls $b^3$, and end wall $b^4$, of said tank is an inclined platform $b^7$, which extends rearwardly from the bottom of the door opening and the lower end thereof is directed horizontally or at a slight angle upwardly. Journaled in the side walls $b^3$, of said tank B, is a beater shaft C, on which are bolted or otherwise rigidly secured flexible beater arms $c$, constructed of any suitable material such as canvas, chains, rubber or other flexible medium. A flat plate $c'$, of suitable length is secured at the lower end of the beater arms and a curved plate $c^2$, is secured thereagainst by means of rivets or in any other suitable manner which strengthens the lower end of the arms and prevents short bending. Rigidly secured to the outer ends of said beater arms $c$, are a plurality of sets of flexible or rigid blades $c^3$—$c^4$—$c^5$, having their outer ends curved outwardly, and, as shown, arranged two abreast but obviously any number may be used in a set.

Journaled in suitable bearings in the side walls $b^3$, below and at the rear of the beater shaft C, is a roll drum or cylinder D, to which are rigidly secured in any preferred manner, bars or plates $d$, of suitable metal or other material, which are shown as angle irons secured to the roller by one flange, and the other flange is directed radially outwardly and parallel the axis of the drum. A suitable driving pulley D', is secured to the drum shaft $d^3$, at one end and sprocket wheels $d'$—$d^2$, are rigidly secured to the beater shaft C, and drum shaft $d^3$, of the drum D, outside and at the opposite side of the tank, and a chain $d^4$, is trained therearound, which drives the beaters.

Above and slightly to the rear of the rear of the center of the roll or drum D, just sufficiently for the bars $d$, to pass, is a platform $d^5$, which is shown as horizontal to the end wall $b^5$, of the tank and is then inclined downwardly to deliver the scraped and cleaned carcasses by gravity upon the operating table or bench X.

A partition E, is secured to the side walls $b^3$, of the tank B, above the latform $d^5$, and pivoted thereto is a door $e$, curved toward the opposite end of the tank and provided with a spring latch $e'$, normally locking the door in closed position. A cable or cord $e^2$, trained around suitable pulleys $e^3$—$e^4$—$e^5$, is secured to the latch $e'$, and extends within convenient reach of an attendant for opening the door to admit the cleaned carcass through the opening in the end wall $b^5$, upon the platform X, and if desired a suitable strip of flexible material $e^6$, such as canvas or swinging doors may close said exit.

In the constructions illustrated in Figs. 3 to 7 inclusive, the machines are arranged for large capacity and the scalding vat and delivery platform may be the same as shown in Figs. 1 and 2, or any other form, and preferably automatically closing doors are employed similar to those before described or suitable curtains or aprons as $e^6$. Supported on suitable uprights or posts is a water tank F, having suitable side and end walls $f$—$f'$—$f^2$, and which is provided with steam, water and clean-out pipes and valves as before described. Said beater arms $g$, as shown clearly in Figs. 3 and 4, are inclined outwardly at a suitable angle longitudinally with the shaft toward the delivery end of the machine by means of wedge blocks H. Said wedge blocks, as shown in Figs. 9 and 10, are provided with a straight edge $h$, which is concaved to conform to the convex surface of the shaft and the opposite side $h'$, is inclined at an angle depending upon the desired angularity of the beaters. The wedges are secured on the shaft between the beater arms having their apexes directed, as shown, toward the entrance to the machine, and bolts rigidly secure the wedges and beaters in oppositely disposed pairs on the shaft, as shown clearly in Fig. 4. Journaled in the end walls $f^2$, of the tank below the beater shaft G, are spiral rolls, drums or cylinders K—K' each having gudgeons or shafts in the ends thereof which extend through suitable watertight journal boxes beyond the ends of the tank. Said rolls or cylinders K—K', as shown in Fig. 6, are constructed of metal, wood, canvas or other suitable material. The roll or drum K, is provided with a bar, strap, or band $k'$, of metal or other suitable material coiled spirally around the roll in the form of a helix and which extends from end to end of the roll. The roll or drum K', is provided with a bar, strap or plate $k^2$, of metal or other suitable material and is shown as an angle iron which extends longitudinally of the roll or drum and is curved partly therearound forming a spiral roll or drum. The bands, straps, bars or coils are constructed in two forms, namely, rigid spirals or bars, which are made of material such as steel or other non-yielding material and resilient and flexible spirals or bands constructed of spring steel, rubber or other suitable material, the object of which will be hereinafter described.

It is to be distinctly understood that in the construction shown, any form of roll or drum may be used and either flexible or rigid bars or ribs may be used with any form of drum. The specific construction used depends entirely upon the specific demands of the user, e. g., for a large slaughter house a metal cylinder may be used with steel ribs which are slightly flexible to yield should the machine operate above a given velocity, or a yielding cylinder may be used such as a solid canvas or rubber cylinder, and either yielding or non-yielding ribs. On the other hand, in the smaller plants where one hog is operated on at a time, either a metal or other cylinder may be used with either yielding or non-yielding ribs, and the construction for any user may vary to meet the exigencies of the specific case.

I do not claim the combination, in a hog-dehairing machine, of: a power-driven rotating shaft having beaters borne thereon; and coöperatively power-driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism including a plurality of mutually parallel and similarly rotating conveyer-rollers, which are disposed in a segment-formed group concave to the beater shaft, and whose respective axes of rotation are substantially parallel to the aforesaid beater-shaft and extend in the direction in which the carcass is advanced; which is a combination claimed in the Hannaford Patent No. 1016495, issued February 6, 1912. on an application that has been co-pending with my present application; and I do not claim this combination because I am not the inventor of it, as the drawings and specification of my present application do not show the "segment-formed" group of conveyer-rollers shown, described and claimed in said Hannaford patent, but show and describe only a single pair of conveyer-rollers and not the three or more conveyer-rollers necessary to form the "segment-formed" group shown and described and claimed in said Hannaford patent.

Any suitable driving mechanism may be employed, but, as shown in Fig. 4, and dotted lines in Fig. 5, sprocket wheels $f^3$—$f^4$—$f^5$—$f^6$, are secured on the ends of the drum or roll shafts and beater shaft respectively and actuate the drums or rolls K and K' and the beaters in the same direction, as shown by the arrows in Figs. 3 and 5. Thus the beater striking the carcass moves in an opposite direction to the drums or rolls.

Guards L—L' are secured on each side of the tank and inclined downwardly to a point approximately over the center of the rolls and allow the spiral to nicely clear the same. As shown in Fig. 5, both rollers M—M' are similar to the spiral roll or drum K', before described.

In the construction illustrated in Fig. 8, the tank N, is inclined toward the delivery end and is provided with a suitable outlet $m$, at the lower end thereof, adapted to deliver the refuse and hair therethrough into a receptacle from which it is delivered to any suitable place, and a water supply tank $K^2$, is situated beneath the tank by means of which water is supplied to clean the carcass by any suitable means. The spiral rollers O, are inclined longitudinally of the tank, as is also the scraper shaft P, and the beater arms $p$, are arranged thereon as before described with reference to Fig. 3. The drive is similar to that before described.

The operation is as follows: The construction illustrated in Figs. 1 and 2, is for a small capacity machine. The hogs, after being suitably scalded in the vat or tank A, are moved upon the elevator $a^3$, which delivers them through the door $b^6$, and the carcasses move by gravity to the end of the platform $b^7$, and upon the roller D. Inasmuch as the bars $d$, are parallel with the axis of the roller upon rotation thereof the bars at each revolution engage the hog and rotate or turn the same continuously. The hog is not moved longitudinally, inasmuch as the roll or drum is not spiral and the scrapers which rotate oppositely from the direction of rotation of the drum whip and scrape the hair and refuse from the carcass as the same is being rotated. The beaters prevent the carcass from being thrown rearwardly from the rotating drum and the rigid door $e$, prevents the carcass from being moved by the beaters forwardly beyond the roll, so that at all times the carcass is continuously turning in position for the beaters to act continuously on all parts thereof. The water level in the tank may be any preferred height, but is shown as slightly above the roller D, approximately on a level with the middle of the carcass so that the carcass is lying and rotating in water (which is heated or not, as is found necessary) and the beaters acting thereon not only scrape the bristles therefrom, but polish the carcass. After the carcass is thoroughly cleaned, the cord $e^2$ is pulled, releasing the catch and opening the door and the carcass is forced upon the platform $d^5$, and is delivered by gravity upon the operating table or bench X. The cord is released, and the operation repeated.

The construction shown in Figs. 3 to 7 inclusive, is a larger capacity machine, and rollers and beater shafts extend longitudinally of the machine. A plurality of spiral rolls or drums of the same kind may be employed, or, of course, one of each construction may be employed acting conjointly. Suitable doors may be provided at each end of the device for the entrance and exit of the carcass, but of course the construction of which forms no part of this invention.

The operation of the spiral rollers shown in Figs. 3, 4 and 6 are as follows: The roller K' rotates as shown by the arrow, to the left, and the bars or spirals $k^2$, striking the carcass constantly rotate or turn the same inwardly upon the roller K, said roller K, rotating in the same direction, the helical spiral forces the carcass endwise therealong at a rate dependent upon the number of revolutions per minute made, and the roll or drum K' also aids in moving the carcass therealong. At the same time, the carcasses are being turned and passed through the tank the beaters $g^2$ are acting thereon on all parts of the carcass, and, inasmuch as the beater arms are of flexible material, the same conform to the carcass and a large surface of the hog is scraped by each sweep of the sets of blades. Owing to the angularity of the beaters, the same strike the carcass and force it toward the delivery end of the machine, thus pulling the carcass along, aiding the rolls and drums. The guards L—L' prevent all possibility of the carcasses from being dislodged although danger from this source is slight. As before described, the water level in the tank is maintained at the desired height to wash and clean the carcass.

It may be desired (according to various circumstances and the mode of drive) to use either the rigid spiral rollers, or those having flexible spirals thereon, and the operation in either case is the same, except where flexible and resilient spirals are used, they may be constructed for a maximum speed at which to pass the carcass through the tank, and when the revolutions of the rollers exceed a certain velocity from carelessness or other causes, the spirals yield and the carcasses thus cannot be forced through the machine at a greater rate than desired. The advantages of this are obvious, for in handling the carcasses in large quantities, the machine is operated at full speed, and, should the drive become too rapid, the carcasses nevertheless are passed through the machine at a rate for efficient scraping. Where two spiral rolls of similar construction are used, as shown in Fig. 5, the operation is similar and both rolls coact in forcing the carcasses therealong as before described.

If preferred, the operating mechanisms may be inclined, as shown in Fig. 10, thus utilizing gravity to assist in conveying the carcass through the machine, and the tank may or may not be inclined.

It is seen that the use of spraying devices and pumps are eliminated, and that the carcass is washed clean as it is rotated continuously in water. Furthermore, should the carcasses not be sufficiently scalded for removal of the bristle, the carcass may again be scalded in the tank as the scrapers act thereon.

Many changes of construction may be varied without departing from the principles of this invention, and I therefore do not desire to limit this application for patent as to details, or otherwise than necessitated by the prior art.

I claim as my invention:

1. In a hog dehairing machine, in combination, a power driven rotating shaft having beaters borne thereon, and coöperatively power-driven and rotarily acting conveyer mechanism adapted to freely and completely support the carcass and at the same time roll it laterally and advance it longitudinally while presenting it to the simultaneous dehairing action of the scraper mechanism, said carcass being free of any grappling to the advancing means, said conveyer mechanism including a plurality of mutually parallel and similarly rotating conveyer rollers whose respective axes of rotation are substantially parallel to the aforesaid beater shaft and extend in the direction in which the carcass is advanced.

2. In a hog dehairing machine, in combination a power driven rotating shaft having beaters borne thereon, and coöperatively power driven and rotarily acting conveyer mechanism adapted to freely and completely support the carcass and at the same time roll it laterally and advance it longitudinally while presenting it to the simultaneous dehairing action of the scraper mechanism, said carcass being free of any grappling to the advancing means, said conveyer mechanism including a plurality of mutually parallel and similar rotating conveyer rollers, and said beater shaft disposed in a position substantially horizontal and paralleling the face of said conveyer mechanism upon which said carcass is so rolled, and extending in the direction in which the carcass is advanced.

3. In a hog dehairing machine, in combination a power driven rotating shaft having beaters borne thereon, and coöperatively power driven and spirally acting conveyer mechanism adapted to freely and completely support the carcass and at the same time roll it laterally and advance it longitudinally while presenting it to the simultaneous dehairing action of the scraper mechanism, said carcass being free of any grappling to the advancing means, said conveyer mechanism including a plurality of mutually parallel and similarly rotating conveyer rollers whose respective axes of rotation are substantially parallel to the aforesaid beater shaft and extend in the direction in which the carcass is advanced.

4. In a hog dehairing machine, in combination, a power driven rotating shaft having beaters borne thereon, and coöperatively power driven and rotarily-acting conveyer mechanism adapted to freely and completely support the carcass and at the same time roll it laterally and advance it longitudinally while presenting it to the simultaneous dehairing action of the scraper mechanism, said carcass being free of any grappling to the advancing means, said conveyer mechanism including a plurality of mutually parallel and similarly rotating conveyer rollers whose respective axes of rotation are substantially parallel to the aforesaid beater shaft and extend in the direction in which the carcass is advanced, said power drive connections being so disposed that the sweep of the beaters is in an angular direction reverse to that of the rotarily moving conveyer mechanism face upon which the carcass is rolled, whereby the carcass is rolled over and over by the conjoint action of the beaters and the conveyer rollers.

5. In a hog-dehairing machine, in combination: a power-driven rotating shaft having beaters borne thereon; and coöperatively power driven and rotarily-acting conveyer mechanism adapted to freely and completely support the carcass and at the same time roll it laterally and advance it longitudinally while presenting it to the simultaneous dehairing-action of the scraper mechanism, said carcass being free of any grappling to the advancing means; said conveyer-mechanism including a plurality of mutually parallel and similarly rotating conveyer-rollers having spirally ribbed peripheries, the ribbing being adapted both to advance the carcass and to have a scraping action as the rolling carcass slips across the exposed edges of the ribs; substantially as specified.

6. In a hog-dehairing machine, in combination: power-driven and rotarily-acting flexible scraper-mechanism; and coöperatively power-driven and rotarily-acting conveyer mechanism adapted to freely and completely support the carcass and at the same time roll it laterally and advance it longitudinally while presenting it to the simultaneous dehairing-action of the scraper-mechanism, said carcass being free of any grappling to the advancing means; said conveyer-mechanism including a plurality of mutually parallel and similarly rotating conveyer-rollers that act conjointly and that severally include spirally-acting means for so advancing said carcass; substantially as specified.

7. In a hog-dehairing machine in combination: power driven rotating beaters; and coöperatively acting conveyer mechanism adapted to freely and completely support the carcass and at the same time roll it laterally, while presenting it to the simultaneous dehairing-action of the scraper-mechanism, said conveyer-mechanism including a plurality of mutually parallel and similarly rotating conveyer-rollers whose respective axes of rotation are substantially parallel to the aforesaid beater-shaft and extend in the direction in which the carcass is advanced.

8. In a hog-dehairing machine, in combination: a shaft, beaters borne thereon; and coöperatively power-driven conveyer-mechanism adapted to support the carcass and at the same time roll it laterally and advance it longitudinally while presenting it to the simultaneous dehairing-action of the beaters, said carcass being free of any grappling to the advancing means; said conveyer-mechanism including a plurality of conveyer-rollers; said beater-shaft being disposed in a position substantially horizontal and paralleling the face of said conveyer-mechanism upon which such carcass is so rolled, and extending in the direction in which the carcass is advanced.

9. In a hog-dehairing machine, in combination: a shaft, beaters thereon; and spirally-acting conveyer-mechanism adapted to support the carcass and at the same time roll it laterally and advance it longitudinally while presenting it to the simultaneous dehairing-action of the scraper-mechanism, said conveyer-mechanism including a plurality of mutually parallel and similarly rotating conveyer-rollers, whose respective axes of rotation are substantially parallel to the aforesaid beater-shaft and extend in the direction in which the carcass is advanced.

10. In a hog-dehairing machine in combination: a power-driven rotating shaft having beaters borne thereon; and coöperatively power driven and rotarily-acting conveyer-mechanism adapted to freely and completely support the carcass and at the same time roll it laterally and advance it longitudinally while presenting it to the simultaneous dehairing-action of the scraper-mechanism, said carcass being free of any grappling to the conveyer mechanism; said conveyer-mechanism including a plurality of mutually parallel and similarly rotating conveyer-rollers that have spirally ribbed peripheries, the ribbing being adapted both to advance the carcass and to have a scraping action as the rolling carcass slips across the exposed edges of the ribs.

11. In a hog-dehairing machine, in combination: flexible scraper mechanism; coöperatively and rotarily-acting conveyer-mechanism adapted to freely and completely support the carcass, said carcass being free of any grappling to the conveyer mechanism; said conveyer-mechanism including a plurality of mutually parallel and similarly rotating conveyer-rollers that act conjointly and that severally include spirally-acting means for so advancing said carcass.

12. In a machine of the class described a roll or drum, bars or strips rigidly secured thereon, and adapted to advance a partly submerged carcass longitudinally of the roll.

13. A dehairing and polishing machine of the class described embracing rotatable rollers and a plurality of beaters rotatably journaled transversely above said rollers, said beaters faced partly in the direction of advancement of a carcass.

14. A machine of the class described comprising rollers, strips thereon to scrape and advance the carcass longitudinally therealong, and pairs of oppositely disposed beaters arranged successively along above said rollers.

15. A machine of the class described comprising parallel rollers, beaters journaled above the same and directed to rotate oppositely to the direction of rotation of the rollers, and guides adapted to keep the carcass in proper position on the rollers.

16. A machine of the class described embracing rollers adapted to advance a carcass longitudinally therealong, beaters rotatable opposite said rollers and angled in the direction of travel of the carcass, and inclined guides extending upwardly from substantially the highest point on said rollers and extending longitudinally parallel to the same adapted to keep the carcass properly disposed upon the rollers.

17. A machine of the class described embracing beaters, supporting and conveying rollers therebeneath, and rigid parallel guides above and on each side extending longitudinally of said rollers to insure proper handling of the carcass.

18. A machine of the class described embracing similarly rotatable rollers, beaters rotatable oppositely thereto, said beaters angled to advance the carcass longitudinally as well as rotate the same transversely and guides on each side of the rollers to keep the carcass thereon.

19. In a device of the class described a plurality of members rotating in the same direction, and yieldable scraping means mounted on said members adapted to scrape and rotate the carcasses supported thereon.

20. In a device of the class described coacting rolls adapted to support and rotate a carcass, and yielding scrapers rotating therewith adapted to scrape the carcass.

In testimony whereof I have hereunto subscribed my name in the presence of two subscribing witnesses.

JOHN W. KOHLHEPP.

Witnesses:
LAWRENCE REIBSTEIN,
CHARLES W. HILLS, Jr.